United States Patent
Joyce

(12) 
(10) Patent No.: US 6,910,328 B1
(45) Date of Patent: Jun. 28, 2005

(54) VECTORABLE VARIABLE AREA NOZZLE

(75) Inventor: Nicolas J. Joyce, Bristol (GB)

(73) Assignee: Rolls-Royce PLC, London (GB)

( * ) Notice: Subject to any disclaimer, the term of this patent is extended or adjusted under 35 U.S.C. 154(b) by 1826 days.

(21) Appl. No.: 07/647,524

(22) Filed: Jan. 18, 1991

(30) Foreign Application Priority Data

Jan. 26, 1990 (GB) .............................................. 9001822

(51) Int. Cl.$^7$ ................................................. F02K 1/12
(52) U.S. Cl. ................ 60/232; 239/265.19; 239/265.35
(58) Field of Search ............. 60/232, 271; 239/265.19, 239/265.33, 265.35, 265.37

(56) References Cited

U.S. PATENT DOCUMENTS

| | | | |
|---|---|---|---|
| 4,037,405 A | 7/1977 | Huenniger et al. | ............ 60/229 |
| 4,463,902 A | * 8/1984 | Nightingale | ............ 239/265.37 |
| 4,778,109 A | 10/1988 | Jourdain et al. | ........ 239/265.27 |
| 4,836,451 A | * 6/1989 | Herrick et al. | ................. 60/232 |

FOREIGN PATENT DOCUMENTS

| | | |
|---|---|---|
| EP | 0275757 | 7/1988 |
| EP | 0281494 | 9/1988 |
| EP | 0286572 | 10/1988 |
| EP | 0298010 | 1/1989 |
| GB | 2077360 | 12/1981 |
| GB | 2155552 | 9/1985 |

* cited by examiner

Primary Examiner—Michael J. Carone
(74) Attorney, Agent, or Firm—Oliff & Berridge, PLC

(57) ABSTRACT

A vectorable variable area nozzle is formed by a pair of parallel sidewalls, a pair of opposed clamshell elements arranged between the sidewalls and each able to rotate about an axis perpendicular to the sidewalls and a pair of flaps each pivotally lined to the downstream end of one of the clamshell elements.

In use the thrust produced by the nozzle can be vectored by rotating the two clamshells about their respective axes.

13 Claims, 4 Drawing Sheets

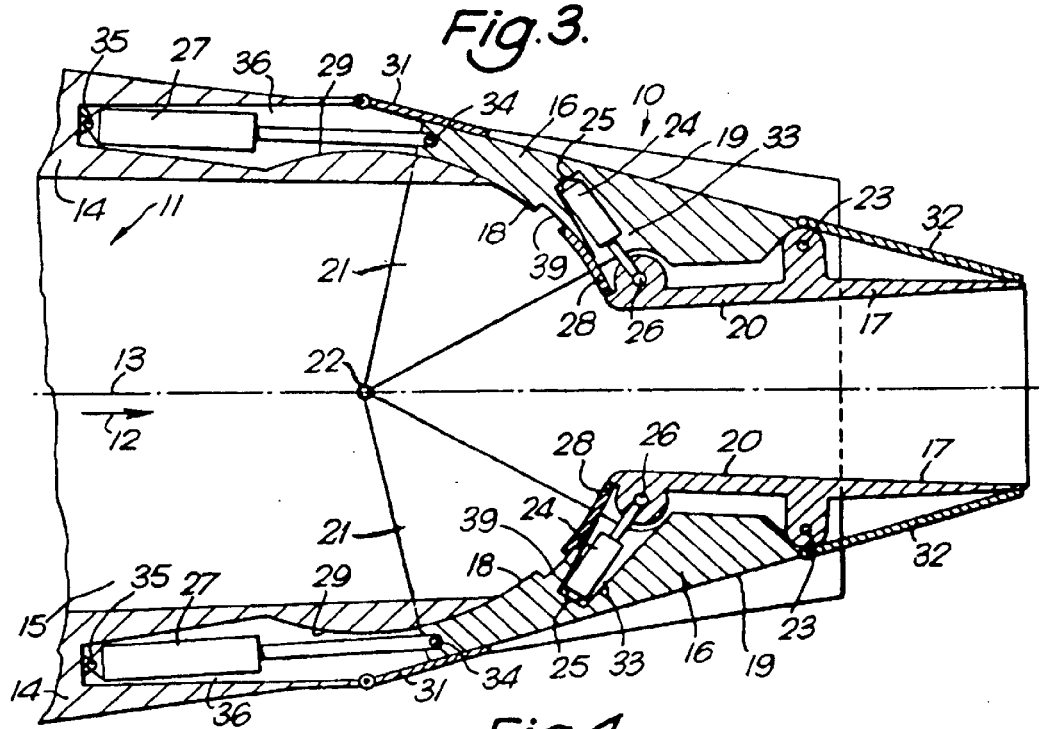
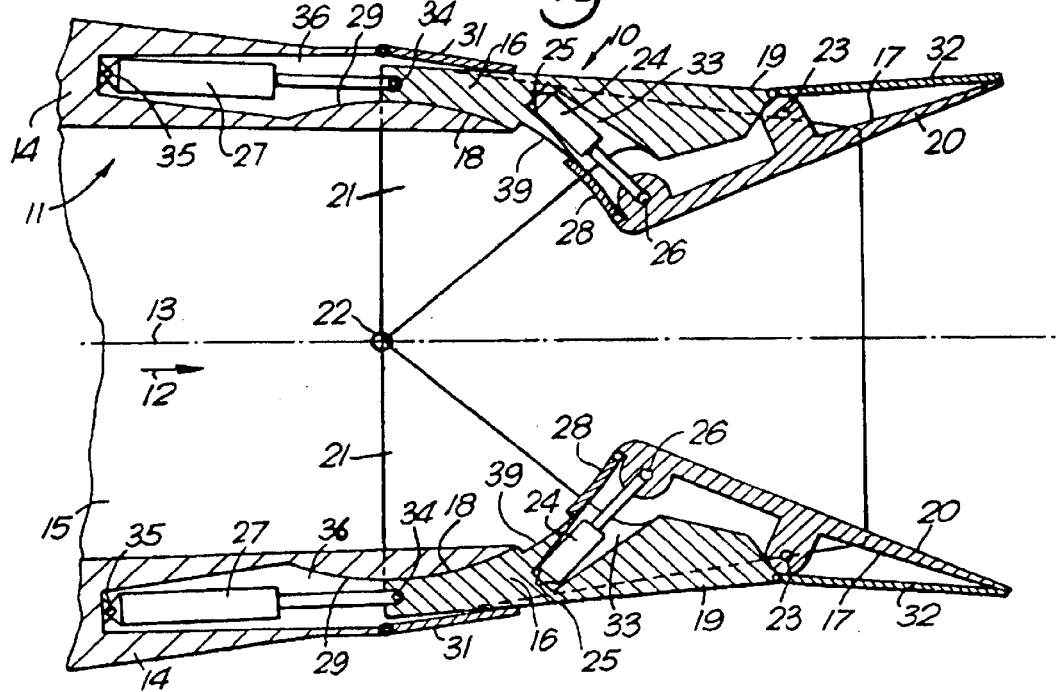

VECTORABLE VARIABLE AREA NOZZLE

FIELD OF THE INVENTION

This invention relates to a vectorable variable area nozzle for use on a jet engine, and particularly to a nozzle able to vector in a single plane.

DESCRIPTION OF THE PRIOR ART

A known nozzle of this type is shown in cross section in FIGS. 1 and 2. This nozzle comprises a jet pipe 1 connected to the downstream end of a gas turbine engine (not shown). A first cylindrical section 2 having an axis 3 is linked to the end of the jet pipe 1 and a second larger cylindrical section 4 coaxial with the first is placed with its inner surface in sliding contact with the outer surface of the first cylindrical section 2. A duct 5 is linked to the downstream end of the second cylindrical section 4. A convergent variable area section 6 is then linked to the downstream end of the duct 5 and a divergent variable area section 7 is linked to the downstream end of the convergent section 6.

To vector the thrust of the nozzle the second cylindrical section 4 is pivoted about the axis 3, sliding over the first cylindrical section 1 and altering the facing of the convergent and divergent sections 6 and 7 which are secured to it.

The convergent section 6 is formed by a plurality of linked segments, each of the segments forming a circumferential sector of the convergent section 6 and 5. In order to vary the throat area of the nozzle the segments are pivoted relative to the duct 5 so that their downstream ends define a smaller or larger area. The nozzle is kept gas tight during this movement by the segments remaining in sliding contact with one another.

The divergent section 7 is also formed by a plurality of linked segments. Each of the segments forms a circumferential section of the divergent section 7 and is pivotally linked to the end of the convergent section 6. To vary the exit area of the nozzle the segments are pivoted relative to the convergent section 6 so that their downstream ends define a smaller or larger area. Again the nozzle is kept gas tight by the segments remaining in sliding contact with one another.

In FIG. 1 the nozzle is shown with minimum throat and exit areas while in FIG. 2 the nozzle is shown with maximum throat and exit areas. Such a system has a number of disadvantages, a complex and heavy actuating system is needed because separate actuators are required to vector the nozzle and to alter its throat and exit areas, the vectoring actuator especially must be very powerful because it must move the other actuators. The large number of moving parts requires complex sealing arrangements, which add weight and cost.

BRIEF SUMMARY OF THE INVENTION

This invention is intended to provide a vectorable variable area nozzle at least partially overcoming these problems.

This invention provides a vectorable variable area nozzle having a variable throat area and a variable exit area for a gas turbine engine, the nozzle comprising, a pair of fixed parallel sidewalls, a pair of opposed elements extending between the sidewalls defining a convergent section of the nozzle between them and both arranged to rotate relative to the sidewalls about a single axis perpendicular to the sidewalls in order to vector the thrust produced by the nozzle or vary the throat and exit areas of the nozzle, and a pair of opposed flaps extending between the sidewalls downstream of the convergent section defining a divergent portion of the nozzle between them and each able to rotate relative to a respective one of the elements about a separate axis.

BRIEF DESCRIPTION OF THE DRAWINGS

A nozzle embodying the invention is shown by way of example only in the accompanying diagrammatic figures in which:

FIG. 3 shows a nozzle employing the invention in cross section in a first configuration, FIGS. 4, 5 and 6 show the same nozzle as shown in FIG. 3 in cross section in three further configurations.

DETAILED DESCRIPTION

Figure 1:
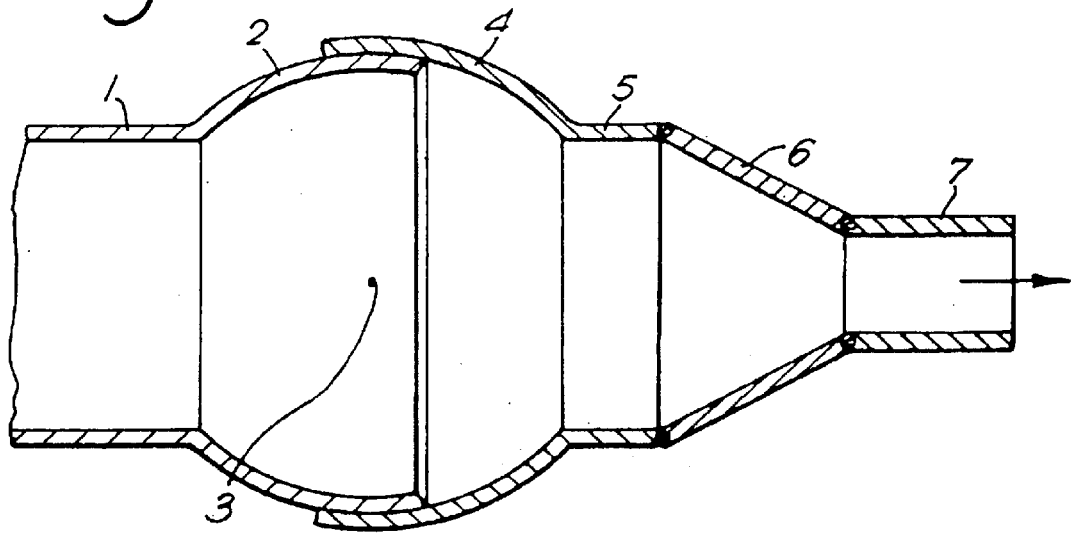
FIG. 1 shows a known vectorable variable area nozzle in cross section in a first configuration.
Figure 2:
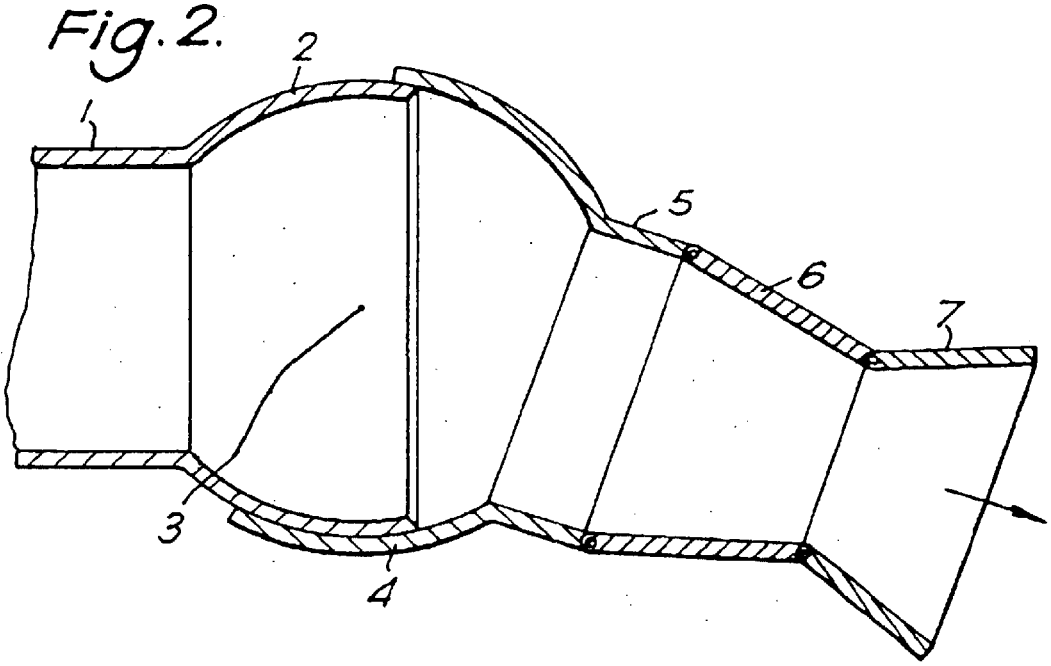
FIG. 2 shows the same nozzle in cross section in a second configuration.

Referring to FIGS. 3 to 6 a cross section along the axis of a variable area nozzle 10 is shown. Exhaust gasses from a gas turbine engine including an afterburner (not shown) travel along a duct 11 in the direction of the arrow 12. The duct 11 is formed by a pair of parallel walls 14 and a pair of parallel sidewalls 15 and is rectangular and symmetrical about an axis 13.

The nozzle 10 is at the downstream end of the duct 11 and is formed by a pair of opposed clamshell elements 16 and a pair of opposed flaps 17.

The clamshell elements 16 and flaps 17 extend across the full width of the duct 11 between the two sidewalls 15.

Each of the clamshell elements 16 has an inner surface 18 curved to form a section of a cylinder and a flat outer surface 19. Each of the flaps 17 has a flat inner surface 20.

The opposed inner surfaces 18 of the clamshell elements 16 and the upstream ends of the flaps 17 define a convergent section of the nozzle 10, while the opposed inner faces 20 of the flaps 17 define a divergent section of the nozzle 10. The throat area of the nozzle 10 is controlled by the separation of the upstream ends of the two flaps 17 and the exit area of the nozzle 10 is controlled by the separation of the downstream ends of the two flaps 17.

Each of the clamshell elements 16 has a support member 21 at each end adjacent to the sidewalls 15. Each support member 21 is secured at one end to a clamshell element 16 and is pivotally linked at its other end to a sidewall 15 for rotation about an axis 22. All of the support members 21 are arranged to rotate about the same axis 22 which is perpendicular to the sidewalls 15.

The axis of the cylindrical surfaces 18 of the clamshells 16 are coaxial with the axis 22.

Each of the flaps 17 is pivotally linked to a respective one of the clamshell elements 16 for rotation about an axis 23 perpendicular to the sidewalls 15.

Each of the axes 23 are situated at a position adjacent the mean, center of pressure on their respective flaps 17, that is approximately halfway along their respective flaps 17, in order to reduce the couple acting on the flaps 17 about their respective axis 23 due to the pressure of the gas in the duct 11 acting on the inner faces 20 of the flaps 17.

Linear actuators 24 are each attached to a clamshell element 16 at a point 25 and to a flap 17 at a point 26. By altering the lengths of the actuators 24 the flaps 17 can be rotated about their respective axes 23 relative to the clamshell elements 16. The linear actuators 24 are contained within recesses 33 inside the clamshell elements 16. As a consequence of the positioning of the axes 23 to reduce the pressure generated couple on the flaps 17 the linear actuators 24 can be made relatively lightweight because the load they have to apply is much less than if the axes 23 were at one end of the flaps 17 and so generating a larger pressure couple.

In order to prevent the gasses travelling along the duct 11 from escaping as the flap 17 moves relative to the clamshell element 16 a sealplate 28 is pivotally attached to the leading edge of each flap 17. Each sealplate 28 forms a sliding contact seal with the bottom of a recess 39 in the inner surface 18 of a clamshell element 16. The sealplate 28 is held in contact with the clamshell element 16 by the gas pressure within the duct 11.

Linear actuators 27 are each attached to a clamshell element 16 at a point 34 and to a sidewall 14 at a point 35. By altering the lengths of the linear actuators 27 the clamshell elements 16 can be rotated about the axis 22 relative to the duct 11. The linear actuators 27 are contained within recesses 36 inside the walls 14.

In order to prevent the gasses travelling along the duct 11 from escaping as the clamshell elements 16 move relative to the walls 14 a sliding seal is formed between the curved inner surface 18 of each of the clamshell elements 16 and a curved outwardly facing surface 29 of a respective wall 14. The curved surfaces 18 and 29 are all cylindrical arcs having the axis 22 as their axis of curvature; as a result they remain in contact and form a seal as the clamshell elements 16 rotate about the axis 22.

In operation it is possible to vary the throat and exit areas, divergence angle and direction of thrust of the nozzle 10 by altering the lengths of the linear actuators 27 and rotating the clamshells 16 about the axis 22. It is also possible to vary the throat and exit areas, divergence angle and direction of thrust of the nozzle 10 by altering the lengths of the linear actuators 24 and rotating the flaps 17 about their respective axes 23.

The direction of thrust of the nozzle 10 can be altered independently of the throat and exit areas and divergence angle of the nozzle 10 by rotating the clamshells 16 in the same direction and through the same angle about the axis 22.

Rotation of the clamshells 16 in opposite directions about the axis 22 will alter the throat and exit areas and the divergence angle of the nozzle 10 in the same sense, while rotation of the flaps 17 in opposite directions about their respective axes 23 will alter the exit area and divergence angle in one sense and the throat area in the opposite sense. Thus by appropriate rotations of the clamshells 16 and flaps 17 it is possible to set the throat and exit areas and divergence angles of the nozzle 10 as required.

A plate 31 is hinged to the downstream edge of each of the walls 14. Each of the plates 31 is urged into rubbing contact with the flat outer surface 19 of a respective one of the clamshell elements 16 by spring biasing means (not shown), in order to present a smooth surface to the airflow past the nozzle 10.

Figure 7:
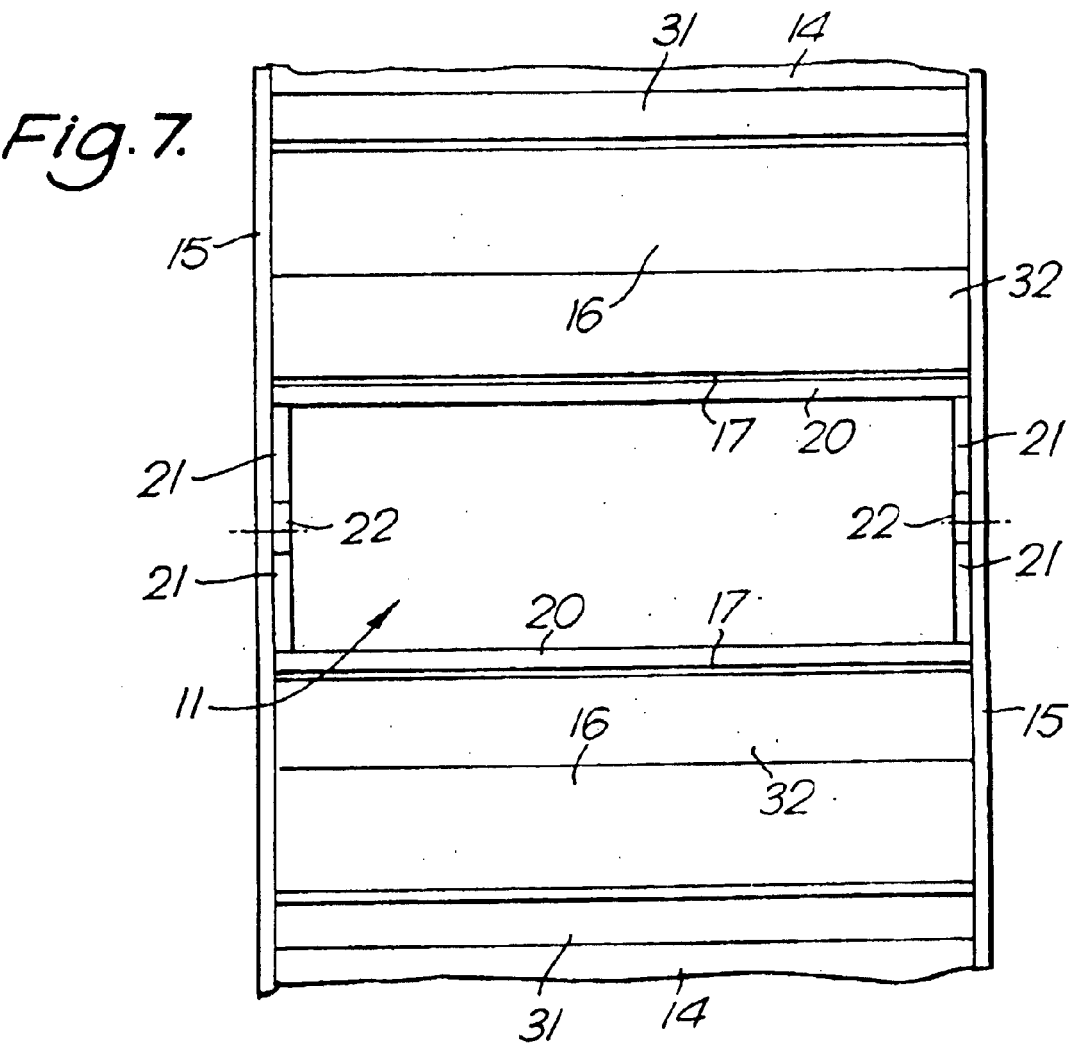
FIG. 7 shows a rear view of the same nozzle as shown in FIG. 3 in the configuration of FIG. 3, and, FIG. 8 shows a detail of the nozzle of FIG. 3, identical parts having the same reference numerals throughout.
Figure 8:
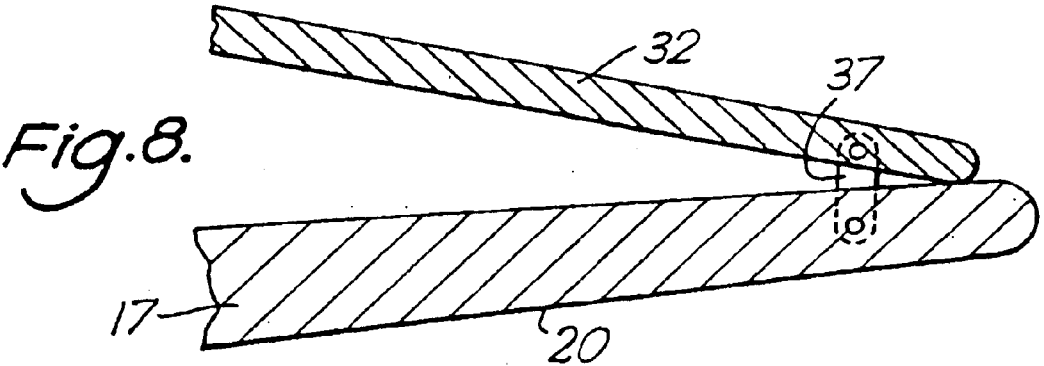

A plate 32 is hinged to the downstream edge of each of the clamshell elements 16. Each of the plates 32 is held in close proximity to the outer surface of a respective one of the flaps 17 by a link member 37 pivotally connected to the plate 32 and the flap 17, in order to present a smooth surface to the airflow past the nozzle 10. The link member 37 is not shown in FIGS. 3 to 5 for clarity but is shown in FIG. 7.

In FIGS. 3 and 4 the nozzle 10 is shown with the clamshell elements 16 and the flaps 17 arranged symmetrically on each side of the axis 13 of the duct 11; as a result the thrust produced by the nozzle 10 acts along the axis 13. This is achieved by altering the lengths of the two linear actuators 24 to be the same and the lengths of the two linear actuators 27 to be the same.

In FIG. 3 the lengths of the linear actuators 24 and 27 have been set to configure the nozzle 10 in a non-afterburning cruising mode. This cruising mode has relatively small throat and exit areas, defined between the upstream and downstream ends respectively of the flaps 17, and a relatively small divergence angle, defined by the angle between the two inner faces 20 of the flaps 17.

In FIG. 4 the linear actuators 27 have been shortened rotating the clamshell sections 16 about the axis 22 and and so increasing the throat and exit areas and divergence angle of the nozzle 10. Also the linear actuators 24 have been lengthened, increasing the exit area and divergence angles but decreasing the throat area of the nozzle 10. As a result the nozzle 10 has been configured for a high engine thrust with, afterburning mode. This afterburning mode has relatively large throat and exit areas and divergence angle.

Figure 5:
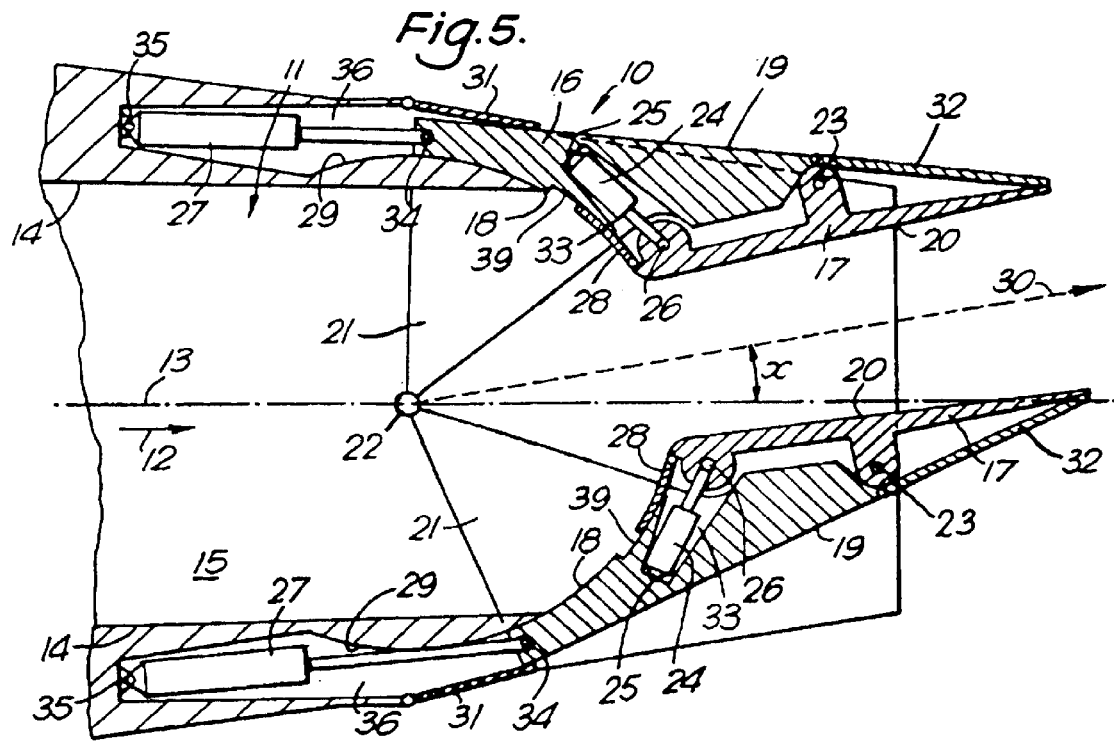

In FIG. 5 the nozzle 10 is shown configured in a non-afterburning mode with vectored thrust. In this vectored thrust mode the lengths of the linear actuators 24 have been left the same as in FIG. 3 while the linear actuators 27 have had their lengths altered in opposite senses so that the clamshell elements 16 have both been rotated anti-clockwise through the same angle X.

As a result the throat and exit areas and divergence angle of the nozzle 10 are unchanged but the nozzle 10 has been rotated anti-clockwise through an angle X about the axis 22 so that it produces a thrust along and is symmetrical about, an axis 30 at an angle X to the axis 13.

Figure 6:
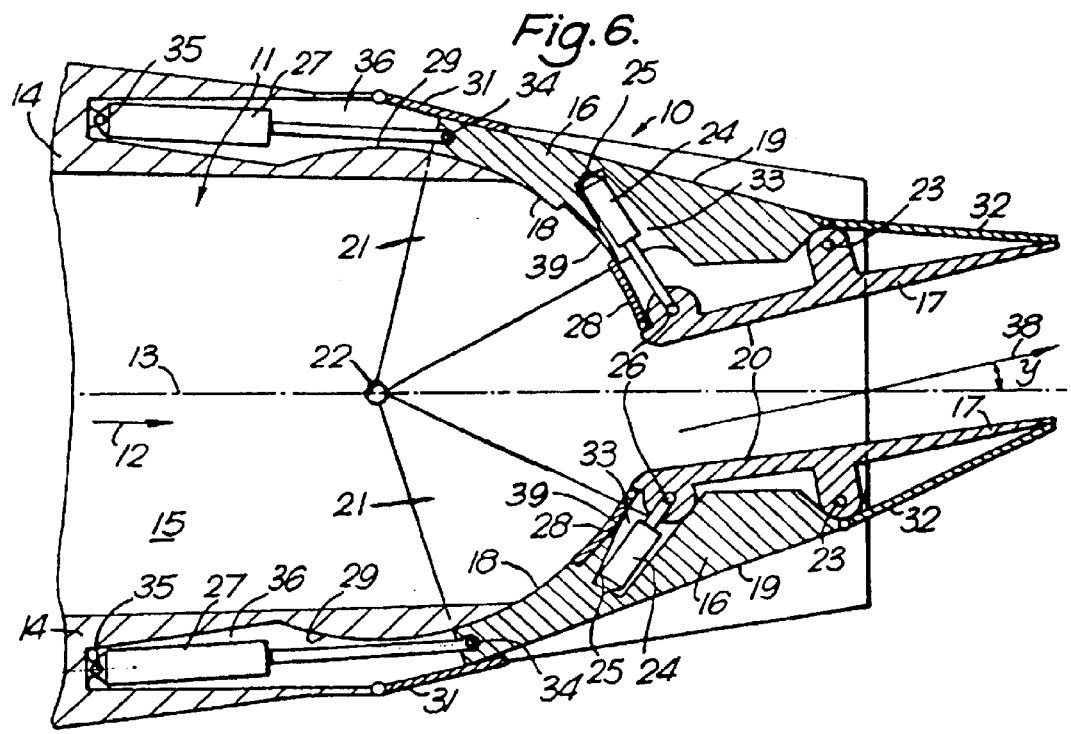

In FIG. 6 the nozzle 10 is shown configured in a non-afterburning mode with vectored thrust. In this vectored thrust mode the lengths of the linear actuators 27 have been left the same as in FIG. 3 while the linear actuators 24 have had their lengths altered in opposite senses so that the flaps 17 have both been rotated anti-clockwise through an angle y.

As a result the divergent section of the nozzle 10 has been rotated anti-clockwise through an angle y so that it produces a thrust along an axis 38 at an angle y to the axis 13. The nozzle 10 is not however symmetrical about the axis 38 since it has a scarfed nozzle because the flaps 17 project different distances along the axis 38.

If desired the nozzle 10 can be configured with any desired combination of throat and exit areas divergence angle and thrust direction by appropriate adjustment of the linear actuators 24 and 27.

The actuators 24 need only exert a relatively small force compared to the force exerted by the linear actuators 27 because the gas pressure loads on the flaps 17 are balanced, at least in part, about their respective axes 23.

Since actuators can generally be made faster acting if the force they must exert is lower this allows a quick response by moving the flaps 17 if thrust vectoring over a small angle is required, to maintain aircraft stability for example, with the clamshells 16 being moved if thrust vectoring over a larger angle is required, for take off for example.

Both the clamshells 16 and flaps 17 could be used simultaneously as desired, this would allow vectoring through larger angles.

Other types of actuators such as rotary actuators, could be substituted for linear actuators 24 and 27 provided they were arranged to rotate the clamshell elements 16 and flaps 17 about their respective axes 22 and 23.

The positioning of the actuators 24 and 27 and the methods of sealing the nozzle 10 could of course be altered if necessary. For example the actuators 27 could be placed outside the sidewalls 15 moving the clamshell via a mechanical linkage.

Although it is preferred to have the two clamshells 16 rotate about a common axis 22 it would be possible to have each clamshell 16 rotate about a separate axis.

Although it is preferred that each of the axes 23 be fixed relative to one of the clamshells 16, a linkage allowing the axes 23 to move relative to the clamshells 16 could be used.

The method of streamlining the nozzle 10 by way of plates 31 and 32 could be altered, for example both plates 31 and 32 could be kept in contact with the nozzle 10 by spring loading or a linkage, instead of the plates 31 and 32 being kept in contact by different methods.

What is claimed is:

1. A vectorable variable area nozzle comprising:
   a pair of fixed parallel sidewalls;
   a pair of opposing elements which extend between the sidewalls and are mounted for rotation about a common first axis orthogonal to the sidewalls;
   a first actuator means for moving a first of the elements about the first axis, and a second actuator means for moving a second of the elements about the first axis, to define a convergent nozzle section;
   a pair of opposing flaps extending between the sidewalls downstream of the opposing elements, each of said flaps being mounted for rotation relative to an adjacent one of the elements at the downstream end of said adjacent element, a first of said flaps being mounted for rotation about a second axis orthogonal to the sidewalls and a second of said flaps being mounted for rotation about a third axis orthogonal to the sidewalls, the respective axis of rotation of each flap being situated between upstream and downstream ends of the flap;
   a third actuator means for moving the first of the flaps about the second axis, and a fourth actuator means for moving the second of the flaps about the third axis, to define a divergent nozzle section.

2. A vectorable variable area nozzle comprising:
   a pair of fixed parallel sidewalls;
   a pair of opposing elements which extend between the sidewalls and are mounted for rotation about a common first axis orthogonal to the sidewalls, inner faces of the opposed elements being cylindrical sections about the common first axis of rotation;
   a first actuator means for moving a first of the elements about the first axis, and a second actuator means for moving a second of the elements about the first axis, to define a convergent nozzle section;
   a pair of opposing flaps extending between the sidewalls downstream of the opposing elements, each of said flaps being mounted for rotation relative to an adjacent one of the elements at the downstream end of said adjacent element, a first of said flaps being mounted for rotation about a second axis orthogonal to the sidewalls and a second of said flaps being mounted for rotation about a third axis orthogonal to the sidewalls;
   a third actuator means for moving the first of the flaps about the second axis, and a fourth actuator means for moving the second of the flaps about the third axis, to define a divergent nozzle section.

3. A vectorable variable area nozzle comprising:
   a pair of fixed parallel sidewalls;
   a pair of opposing elements which extend between the sidewalls and are mounted for rotation about a common first axis orthogonal to the sidewalls;
   a first actuator means for moving a first of the elements about the first axis, and a second actuator means for moving a second of the elements about the first axis, to define a convergent nozzle section;
   a pair of opposing flaps extending between the sidewalls downstream of the opposing elements, each of said flaps being mounted for rotation relative to an adjacent one of the elements at the downstream end of said adjacent element, a first of said flaps being mounted for rotation about a second axis orthogonal to the sidewalls and a second of said flaps being mounted for rotation about a third axis orthogonal to the sidewalls;
   a third actuator means for moving the first of the flaps about the second axis, and a fourth actuator means for moving the second of the flaps about the third axis, to define a divergent nozzle section.
   the third actuator means being attached to the first of the elements and the fourth actuator means being attached to the second of the elements.

4. A nozzle as claimed in claim 3, wherein the second axis is fixed in relation to the first of the elements and the third axis is fixed in relation to the second of by the elements.

5. A nozzle as claimed in claim 3, wherein the flaps are rotatable about their respective axes to vector thrust produced by the nozzle.

6. A method of vectoring a vectorable variable area nozzle, which nozzle comprises:
   a pair of fixed parallel sidewalls;
   a pair of opposing elements which extend between the sidewalls and are mounted for rotation about a common first axis orthogonal to the sidewalls;
   a first actuator means for moving a first of the elements about the first axis, and a second actuator means for moving a second of the elements about the first axis, to define a convergent nozzle section;
   a pair of opposing flaps extending between the sidewalls downstream of the opposing elements, each of said flaps being mounted for rotation relative to an adjacent one of the elements at the downstream end of said adjacent element, a first of said flaps being mounted for rotation about a second axis orthogonal to the sidewalls and a second of said flaps being mounted for rotation about a third axis orthogonal to the sidewalls, the respective axis of rotation of each flap being situtated between upstream and downstream ends of the flap;
   a third actuator means for moving the first of the flaps about the second axis, and a fourth actuator means for moving the second of the flaps about the third axis, to define a divergent nozzle section;
   said method comprising energising the first and second actuator means to rotate the first and second elements about the first axis to vector thrust produced by the nozzle independently of altering the throat area, exit area or divergence angle of the nozzle, and further comprising energising the third and fourth actuator means to rotate the first and second flaps about the second and third axes, respectively, to alter at least one of the throat area, exit area and divergence angle of the nozzle independently of vectoring the thrust produced by the nozzle.

7. A method as claimed in claim 6, wherein the first and second actuator means are energised in opposing senses to rotate the first and second elements in the same sense about the first axis to vector thrust produced by the nozzle independently of altering the throat area, exit area or divergence angle of the nozzle.

8. A method as claimed in claim 7, wherein the first and second actuator means are also energised in the same sense to rotate the first and second elements in opposing senses about the first axis to alter the throat area, exit area and divergence angle of the nozzle independently of vectoring the thrust produced by the nozzle.

9. A method as claimed in claim 8, wherein said exit area and divergence angle are altered in one sense and said throat area is altered in an opposite sense.

10. A method as claimed in claim 6, wherein the third and fourth actuator means are energised in the same sense to rotate the first and second flaps in opposing senses about the second and third axes, respectively, to alter the throat area, exit area and divergence angle independently of vectoring the thrust produced by the nozzle.

11. A method as claimed in claim 10, wherein said exit area and divergence angle are altered in one sense and said throat area is altered in an opposite sense.

12. A method as claimed in claim 10, wherein the third and fourth actuator means are also energised in opposing senses to rotate the first and second flaps in the same sense about the second and third axes, respectively, to vector thrust produced by the nozzle independently of altering the throat area, exit area or divergence angle of the nozzle.

13. A method as claimed in claim 6, wherein one or more of the following steps are performed:

(a) the first and second actuator means are energised in the same sense to rotate the first and second elements in opposing senses about the first axis to alter the throat area, exit area and divergence angle of the nozzle independently of vectoring the thrust produced by the nozzle;

(b) the first and second actuator means are energised in opposing senses to rotate the first and second elements in the same sense about the first axis to vector thrust produced by the nozzle independently of altering throat area, exit area or divergence angle of the nozzle;

(c) the third and fourth actuator means are energised in the same sense to rotate the first and second flaps in opposing senses about the second and third axes, respectively, to alter the throat area, exit area and divergence angle independently of vectoring the thrust produced by the nozzle; and (d) the third and fourth actuator means are energised in opposing senses to rotate the first and second flaps in the same sense about the second and third axes, respectively, to vector thrust produced by the nozzle independently of altering throat area, exit area or divergence angle of the nozzle.

* * * * *

UNITED STATES PATENT AND TRADEMARK OFFICE
CERTIFICATE OF CORRECTION

PATENT NO.   : 6,910,328 B1
DATED        : June 28, 2005
INVENTOR(S)  : Nicolas J. Joyce It is certified that error appears in the above-identified patent and that said Letters Patent is hereby corrected as shown below:

<u>Title page,</u>
Item [*] Notice, delete "Subject to any disclaimer, the term of this patent is extended or adjusted under 35 U.S. 154(b) by 1,826 days.".

Signed and Sealed this

Eighteenth Day of October, 2005

JON W. DUDAS
*Director of the United States Patent and Trademark Office*